Dec. 3, 1957   W. C. GUTHRIE, JR., ET AL   2,814,825
VEHICLE WHEEL-WASHING APPARATUS

Filed May 31, 1956   4 Sheets-Sheet 1

INVENTORS
William C. Guthrie, Jr.
Herbert C. McQuigg
BY Bacon & Thomas
ATTORNEYS

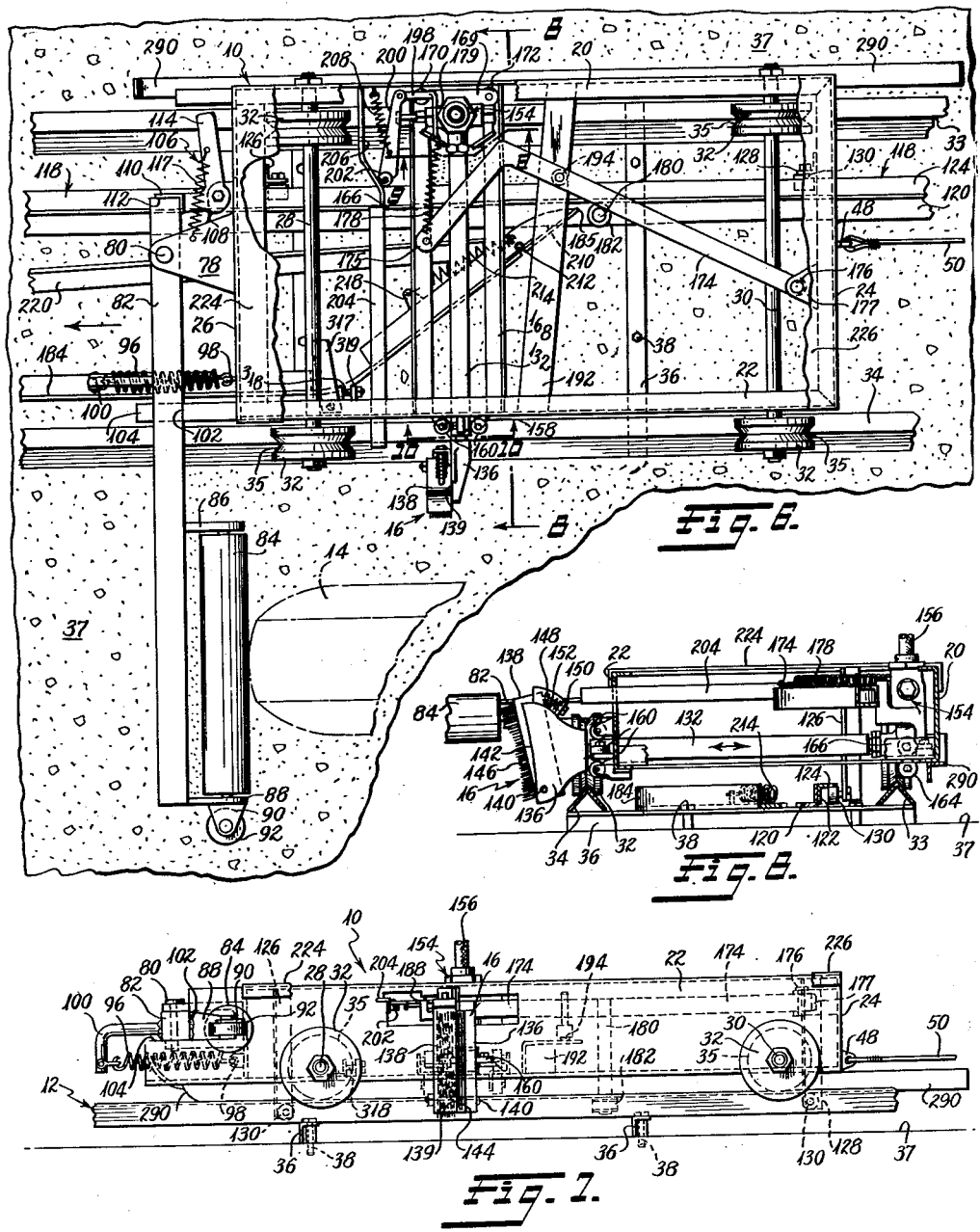

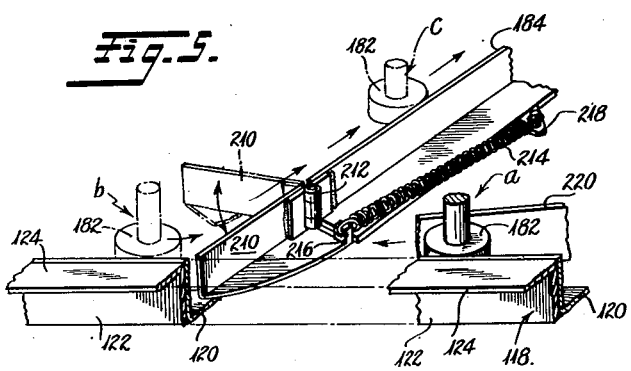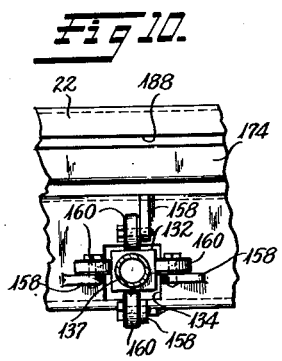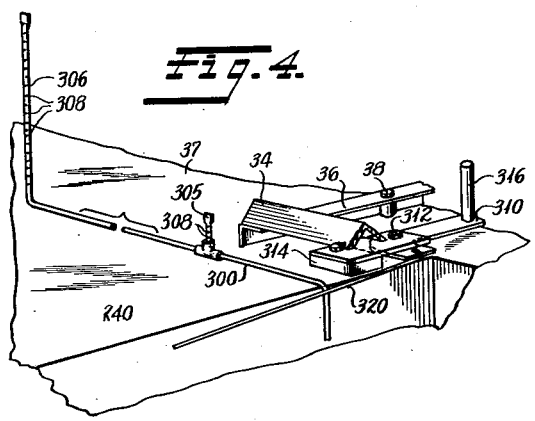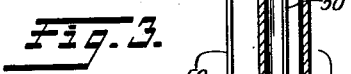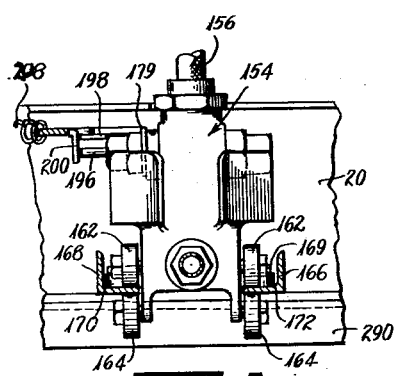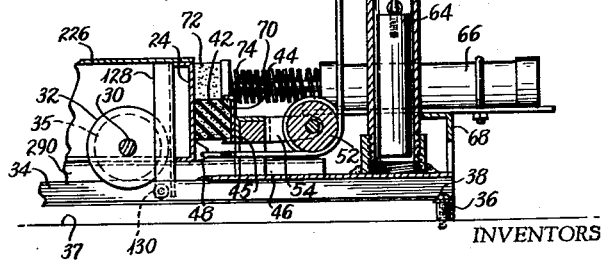

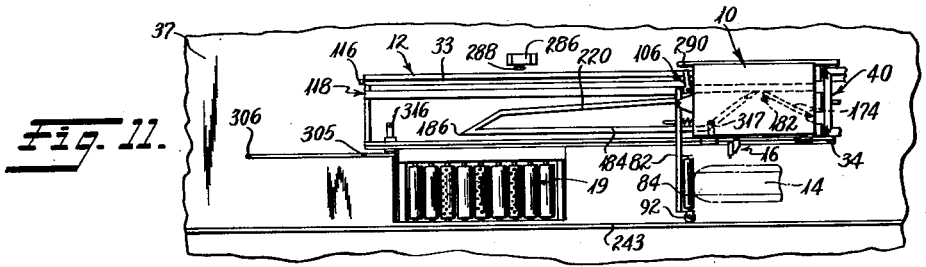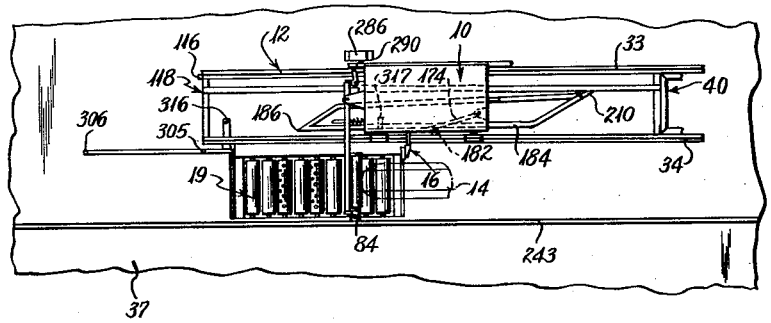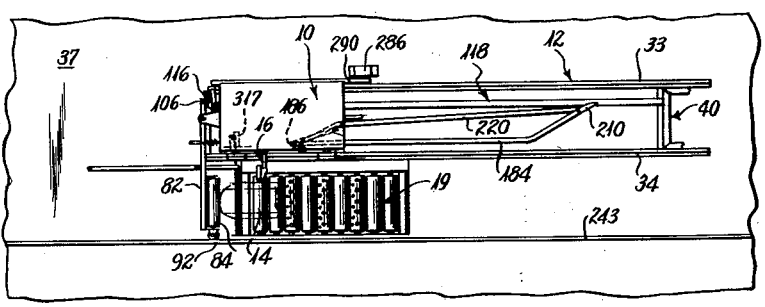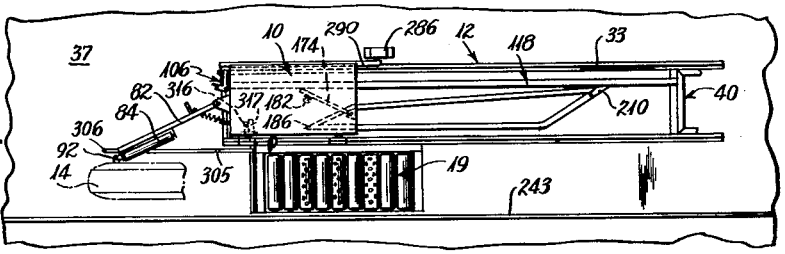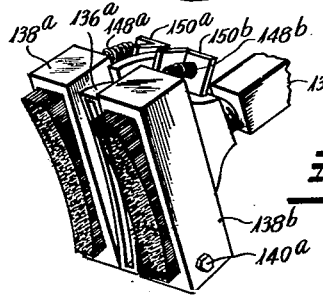

United States Patent Office 2,814,825
Patented Dec. 3, 1957

2,814,825

VEHICLE WHEEL-WASHING APPARATUS

William C. Guthrie, Jr., Vienna, and Herbert Carl McQuigg, Arlington, Va.

Application May 31, 1956, Serial No. 588,559

12 Claims. (Cl. 15—302)

This invention relates to a vehicle wheel-washing apparatus for installation in vehicle washing systems wherein a vehicle or line of vehicles is moved continuously through a plurality of washing operations. More particularly, the invention relates to a fully automatic apparatus of the type described, which subjects the wheels, and especially the tire portions thereof, to the combined action of cleansing fluids and brush pressure during a portion of the forward travel of the vehicle and speeds up the rotation of the wheels during at least a portion of such forward travel without appreciably slackening or jerking the vehicle-towing element or otherwise perceptibly affecting the smooth forward motion of the vehicle along the path of travel through the washing system.

Wheel-washing, and particularly the washing of the tire sidewalls, has presented one of the most troublesome problems of continuous vehicle washing systems. Automatic wheel-washing devices are complicated by the fact that, whereas the wheels are generally the dirtiest part of the vehicle and require the most vigorous cleansing action, they are relatively inaccessible, successive wheels do not follow exactly the same track through the system due to differences in width between the outside faces of wheels of different makes of vehicles, the distance between successive wheels varies with different makes of vehicles, the wheels should be cleansed without delaying the forward movement of the train of vehicles through the system, and the wheel-cleaning operation must not interfere with the other cleaning machinery. The increasing use of white-wall tires on passenger vehicles has placed a greater demand on wheel-washing apparatus.

An object of the present invention is to provide a simple mechanical wheel-washing device which solves the aforementioned problems.

Another object of the invention is to provide improved apparatus for washing the wheels of a vehicle while it is proceeding at a substantially uniform rate through a vehicle-washing system.

Another object of the invention is to provide an improved automatic wheel-washing apparatus which is relatively inexpensive to manufacture and install, is easily adjusted and maintained, requires no high-pressure operating fluids, and places relatively little strain upon the tow system or upon the vehicle being towed.

Another object of the invention is to provide simple mechanical means for automatically positioning cleansing brushes and for injecting cleansing fluid in proper cleansing relation to the wheels of a continuously moving vehicle regardless of the exact line of travel of such wheels through a vehicle-washing system.

Another object of the invention is to provide an improved, fully-automatic wheel-cleansing device which subjects the wheels of a vehicle to cleansing action while the vehicle is being moved forwardly at a continuous rate and which rapidly spins the wheels during a portion of the cleansing operation.

Another object of the invention is to provide an improved wheel-cleaning apparatus wherein cleaning brushes follow the forward motion of the vehicle during a portion of its travel through a cleaning system, and wherein the wheels are subjected to rapid spinning action without danger of dropping the vehicle out of the horizontal path of travel.

Another object of the invention is to provide automatic wheel-cleaning apparatus wherein means are provided for cleansing the wheels during a substantial path of forward advancement of the vehicle so as to obtain maximum cleansing action, but wherein the cleansing apparatus is immediately returned to position for receiving and cleaning the wheels of a closely following vehicle, so that the vehicles can be advanced through the line in substantially bumper-to-bumper relation.

Another object of the invention is to provide a wheel-washing device having means for rapidly spinning the wheels during the course of advancement of a vehicle along the path of travel of the washing system, but wherein such means for spinning the wheels does not necessitate susbtantial vertical movement of the vehicle or vehicle wheels out of the general path of travel so that relatively little strain is placed upon the towing element.

Other objects and advantages of the invention will become apparent from the ensuing description taken in conjunction with the accompanying drawings, in which:

Fig. 3 is a fragmentary enlarged sectional view showing the return mechanism for the carriages shown in Fig. 1;

Fig. 4 is a fragmentary perspective view illustrating the actuating mechanism for wheel-rinsing means;

Fig. 5 is an enlarged fragmentary perspective view showing mechanism for resetting the cam-follower of a movable brush-and-nozzle-carrying assembly of the wheel-washing device at the start of a wheel-washing operation;

Fig. 6 is an enlarged plan view of one carriage and a fragmentary portion of the track assembly, the cover plate of said carriage being broken away to show the structure of the underlying parts;

Fig. 7 is a side elevational view of the carriage shown in Fig. 6;

Fig. 8 is a sectional view through the carriage and track assembly taken on the lines 8—8 of Fig. 6;

Fig. 9 is an enlarged fragmentary sectional view taken generally on the lines 9—9 of Fig. 6;

Fig. 10 is an enlarged fragmentary sectional view taken on the lines 10—10 of Fig. 6, and showing means for guiding the brush-and-nozzle-carrying assembly;

Fig. 11 is a diagrammatic plan view of one carriage and track assembly showing the carriage in the retracted position at the start of a wheel-washing operation;

Fig. 12 is a diagrammatic plan view similar to Fig. 11, but showing the carriage in an advanced position just prior to a rapid wheel-spinning operation;

Fig. 13 is a diagrammatic plan view similar to Figs. 11 and 12, but showing the carriage in a forward position just prior to completion of the wheel-washing operation;

Fig. 14 is a diagrammatic illustration similar to Figs. 12 and 13, showing the carriage in a fully advanced position just prior to retraction to start another wheel-washing operation; and Fig. 15 is an enlarged perspective view illustrating a modification of the brush-and-nozzle assembly.

Figures 1, 2:
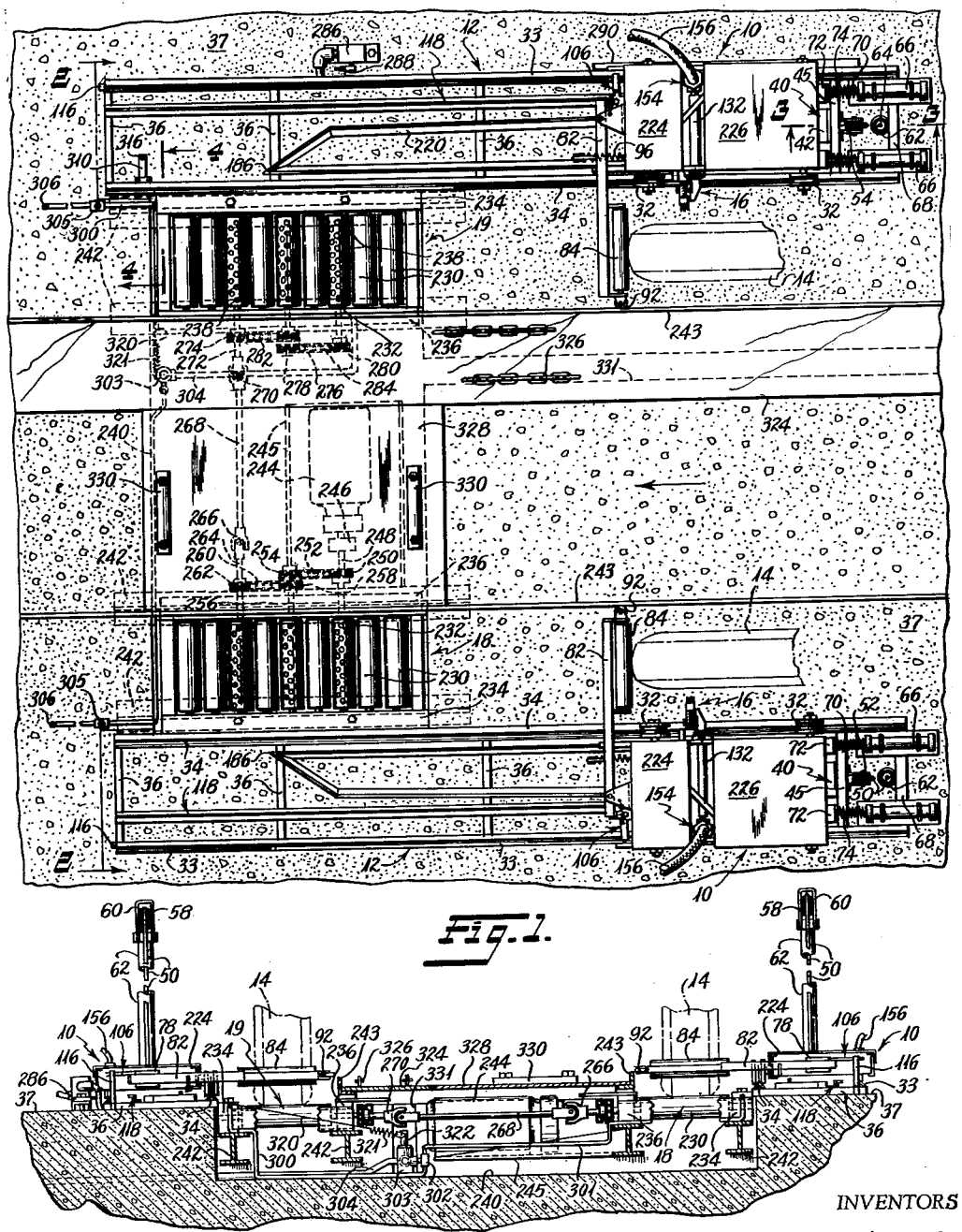
Fig. 1 is a top plan view of a portion of a continuous vehicle-washing system showing the wheel-washing apparatus of the invention installed therein and including a pair of traveling carriages positioned on tracks adjacent the path of travel of the vehicle wheels, said carriages being in their retracted position at the beginning of a wheel-washing operation.
Fig. 2 is a sectional view on the line 2—2 of Fig. 1.

Referring now to the drawings in detail, and particularly to Fig. 1 thereof, the wheel-washing apparatus comprises a combination including a pair of travel carriages 10 mounted on a pair of track assemblies 12 positioned parallel to and adjacent the outer boundaries of the paths of travel of the vehicle wheels such as those shown in dashed lines at 14, each carriage 10 having a laterally movable brush-and-nozzle assembly 16 adapted to be urged by camming action into engagement with the side walls of wheels 14 as the wheels and the carriages 10 move forward, or to the left as viewed in Fig. 1, and a pair of wheel spinning roller assemblies 18, 19 positioned in the path of the wheels 14 and adapted to rapidly spin the wheels over a substantial portion of the forward travel of the wheels 14 and carriages 10 while the brush-and-nozzle assemblies 16 are in cleaning engagement with the side faces of such wheels.

The carriages 10, one of which is shown in detail in Fig. 6, comprise side walls 20 and 22 and end walls 24 and 26 forming a rigid frame carrying axles 28 and 30. Wheels 32 are rotatably mounted upon the axles 28 and 30, suitable bearings being provided therefor. The wheels 32 are adapted to run on rails 33 and 34 of the track assembly 12, these rails conveniently being in the form of inverted angles. The peripheries of wheels 32 are provided with an annular V-shaped groove 35 which conforms in configuration with the angle of rails 33 and 34, whereupon the wheels 32 are guided upon said rails 33, 34. The rails 33 and 34 are mounted on and held in spaced relation by cross-ties 36 to which they may be welded or otherwise secured. Cross-ties 36 in turn are bolted to the floor 37 of the washing system by means of bolts 38. The length of the track assemblies 12 is such as to permit an effective travel distance of the carriage 10 which is just less than the wheel base of the shortest vehicle to be washed and is less than the distance between the back wheels of one vehicle and the front wheels of the next successive vehicle when these vehicles are towed in bumper-to-bumper relation, the shortest combination of vehicles again being taken into consideration.

The carriages 10 are normally urged into a retracted or starting position upon the rails 33, 34 as shown in Figs. 1, 3, and 11, whereby the rear end wall 24 is in contact with a stop member generally designated as 40, which may comprise a sponge rubber or other resilient element 42 (Fig. 3) mounted by means of bracket 44 carried by cross-member 45 which in turn is mounted on a base plate 46 extending between and secured to rails 33 and 34. The means for urging the carriage to the retracted, or starting, position comprises a lug 48 secured to the rear end wall 24 as by welding, or the like, to which is attached one end of a cable 50. The cable 50 passes over a pulley 52 secured by a bracket 54 to cross-member 45, and over a pulley 58 carried by a bracket 60 secured to a hollow pedestal 62, and has its other end attached to a counterweight 64 which is vertically movable within hollow pedestal 62. The counterweight 64 by force of gravity normally retains the carriage 10 in its starting position, and also acts as a means to return such carriage to such position after it has been forwardly advanced during a wheel-washing operation. In order to prevent damage to the carriage 10 upon the rapid return of such carriage to its starting position, buffer means are provided. Such buffer means comprise a pair of cylinders 66 mounted upon a bracket 68, each cylinder 66 having therein a piston (not shown) carrying a shaft 70 having at the outer end thereof a sponge rubber or similar cushioning block 72. The shaft 70 and cushioning blocks 72 are urged outwardly by means of a spring 74 to a position in advance of the stop 40 when the carriage 10 is in its forward position. Upon retraction to the carriage 10, the rear wall 24 first strikes the cushion block 72 retracting the shafts 70 against the force of the springs 74 and pistons within cylinders 66, coming to rest against the stop 40. This arrangement also provides a damping action preventing bouncing of the carriage against stop 40.

The forward end wall 26 of the carriage 10 is provided with an outwardly-extending bearing block 78 (Fig. 6) which carries a shaft 80 pivotally mounting a retractable arm 82, one end of which normally extends laterally outwardly from the carriage 10 into the path of the wheels 14 of the forwardly advancing vehicle. A roller 84 is mounted on the arm 82 between rearwardly-extending bearing plates 86 and 88. The roller 84 is adapted to be contacted by the forwardly advancing wheel 14, and is of sufficient width to contact the wheels regardless of their exact position along the general path of travel. The length of roller 84, for example, may be from 12 to 14 inches. Wheels of different lateral spacing on different makes of vehicles are thereby readily accommodated. The outer bearing plate 88 is provided with a lateral bearing 90 having a small roller 92 rotatably mounted therein, the purpose of such roller 92 being to permit smooth passage of the wheel 14 by the end of arm 82 upon retraction of the arm 82 at the end of the forward travel of the carriage 10. The retractable arm 82 is urged to the position shown in Figs. 1 and 6 by means of a spring 96, one end of which is connected to a lug 98 attached to the forward face of end wall 26 and the other end of which is attached to a bracket 100 carried by the arm 82. The spring 96 urges the arm 82 into contact with a vertical face 102 formed by a cut-out portion in a forwardly extending portion of the side wall 22 of the carriage frame, the bottom face 104 of such cut-out portion acting as a supporting means for such arm 82 in the normal position. The arm 82 is locked in its normal position by means of a locking device 106 pivotally mounted on bracket 108 and having a seat 110 adapted to receive the rear end 112 of the arm 82. The locking element 106 has an extending arm 114 which is adapted to engage an upstanding stop element 116 (Fig. 1) fixed at the end of the rail 33, whereby in the forward position of the carriage 10 the locking device 106 is rotated in a clockwise direction as viewed in Fig. 6, so that the seat 110 will be swung clear of the end 112 of the arm 82, whereby such arm may be retracted by the movement of the wheel 14 against the action of spring 96 permitting the wheel 14 to pass the roller 84 and continue on its way through the washing assembly after the carriage 10 has been stopped at the end of the wheel-washing operation. After passage of the wheel 14, spring 96 returns arm 82 to its normal position. A spring 117 having one end connected to arm 114 and the other end connected to bearing block 78 returns the locking device 106 to its locking position.

In order to hold the carriage 10 upon the rails 33 and 34, and prevent tipping or other displacement of the carriage while it is being advanced by the force of the wheel 14 upon the roller 84, the track assembly 12 is provided with a hold-down rail 118 which, as shown in Fig. 8, may comprise a pair of angle irons 120, 122 secured to the cross-ties 36, the latter angle iron 122 providing a longitudinally-extending flange 124 spaced from the base of the track assembly 12. The end walls 24 and 26 of the carriage 10 are provided with downwardly-extending brackets 126 and 128 carrying rollers 130 at the lower ends thereof, these rollers being disposed beneath the flange 124 of the hold-down rail 118.

The brush-and-nozzle assembly 16 is mounted at the outer end of a conduit 132 of rectangular configuration which extends transversely of the carriage 10 and through an opening 134 (Fig. 10) in the side wall 22 near the bottom thereof. The assembly 16 comprises a nozzle 136 threadedly connected to the outer end of conduit 132 by means of an adapter 137, and a brush 138 adjacent a flat side face 139 of nozzle 136 and pivotally attached to the lower end of such nozzle by means of pivot pin 140. The nozzle 136, as may best be seen in Fig. 8, is vertically elongated, and has a slightly concave face portion 142 of the general configuration of the side wall of a normally inflated automobile tire. The concave face portion 142 is provided with an elongated slot 144 (Fig. 7) for a substantial portion of its length. Slot 144 communicates with conduit 132 whereby steam or other cleaning fluid from conduit 132 may be jetted upon a tire. The brush 138 also has a concave forward portion 146 conforming substantially to the configuration of the side wall of a tire. The top of the brush 138 is urged resiliently outward from the nozzle 136 about pivot pin 140 for a limited distance by means of a spring 148 carried by a spring guide 152 mounted in an opening in a bracket 150 on the upper portion of nozzle 136. By such means the face portion 146 of the brush 138 automatically adjusts itself to contact substantially the entire face of any tire which may pass through the washing apparatus.

A modified form of brush-and-nozzle assembly is shown in Fig. 15, wherein a nozzle 136a carried by the conduit 132 has flat faces on both sides thereof and a pair of brushes 138a, 138b are disposed adjacent such flat side faces and are pivotally connected to the nozzle by means of a pivot pin 140a. Brackets 150a and 150b support spring guides and springs 148a and 148b, which normally urge the brushes 138a and 138b outwardly around the pivot pin 140a. By means of the double brush assembly, more vigorous scrubbing action may be achieved, the first brush loosening the dirt and the second brush providing a final clean-up action.

The rear end of the conduit 132 is provided with a valve 154 (Figs. 6–9) which is connected to a flexible hose 156 which extends overhead with sufficient slack for the carriage motion and leads to a source of cleansing fluid such as steam and detergent. The entire assembly, including the brush-and-nozzle assembly 16, conduit 132, and valve 154, is adapted to be moved as a unit in a direction transverse to the carriage 10, whereby the brush-and-nozzle assembly 16 is extended laterally outward from the carriage 10. The side wall 22 adjacent the opening 134 is provided with four brackets 158 mounting rollers 160, one for each face of the conduit 132, whereby the conduit 132 is guided smoothly and is supported during its outward motion. The valve 154 is provided on each side with top and bottom rollers 162 and 164 (Fig. 9) disposed on either side of a pair of guide rails 166 and 168 which extend transversely within the carriage assembly between the side walls 20 and 22. The rear portion of the valve 154 is further provided with a bracket 169 mounting a pair of rollers 170 and 172 (Fig. 1) about a vertical axis between the inner edges of guide rails 166 and 168, so as to prevent shifting of the valve and brush assembly.

In order to effect the lateral outward movement of the brush-and-nozzle assembly 16, a lever 174 is pivotally mounted at one end around a shaft 176 carried by a bearing block 177 secured to the inside face of rear end wall 24. The lever 174 at its other end 175 is connected to one end of a spring 178, the other end of the spring 178 being connected to a bracket 179 carried by the valve 154. Lever arm 174 is provided at an intermediate position thereof with a downwardly extending rod 180 carrying a rotatable cam follower 182 at the lower end thereof. The cam follower 182 is adapted to engage a cam track 184 forming part of the track assembly 12 and secured to cross-ties 36, the cam track 184 beginning at a position 185 just forward of the cam follower 182 in the retracted position of the carriage 10, and extending to a position 186 (Figs. 1 and 11–14) just to the rear of the cam follower 182 when the carriage 10 is in its fully advanced position. It will be seen that the action of the cam follower 182 upon the cam track 184 will cause the lever arm 174 to be pivoted outwardly around the shaft 176, thereby urging the valve 154, conduit 132, and brush-and-nozzle assembly 16 outwardly by means of the resilient force of connecting spring 178. The side wall 22 of the carriage 10 is cut away at 188 (Fig. 7) to permit the end 175 of the lever 174 to extend therethrough in the fully outward position of such lever. In order to support the lever arm 174 during its arcuate movement, a transverse member 192 is provided between the side walls 20 and 22 and a depending ball roller 194 is provided from the lever arm 174. Roller 194 is adapted to ride upon the upper surface of the transverse member 192 and thereby take any vertical strain from lever arm 174. It will be understood, of course, that bearing block 177 may be of a type which will support the entire weight of the arm 174 whereby the additional support means 192 and 194 may be omitted.

The valve 154, as best seen in Figs. 6 and 9, is of the type having a stem 196 which is normally urged outward by resilient means within the valve structure to thereby close the valve. In the present device, valve 154 is provided with a bracket 198 having a lever arm 200 pivotally connected thereto, the lever arm 200 bearing at an intermediate point thereof upon the top of the valve stem 196. The outer end of the lever arm 200 is provided with a cam follower 202 which is adapted to engage and follow a cam track 204 disposed transversely of the carriage 10 between side walls 20 and 22, and extending outwardly from the wall 22 through opening 188 for a short distance to accommodate cam follower 202 when the valve 154, conduit 132, and brush-and-nozzle assembly 16 are in the fully outwardly extended position, the valve 154 in this position being substantially adjacent the inside face of wall 22. The cut-away portion or opening 188 within the side wall 22 is of sufficient length to permit free passage of the lever 200 and its associated cam follower 202. The valve cam track 204 at its rearward portion 206 permits the cam follower to be in an outer position whereby the valve stem 196 is raised to effect closing of the valve 154. A spring 208, secured to the side wall 20 at one end and to the lever arm 200 at its other end, holds the cam follower 202 in engagement with the cam track 204 during all portions of its travel and also acts as a retracting means for the laterally moving valve 154, conduit 132, and brush-and-nozzle assembly 16 at the end of the washing operation. When the carriage 10 has started to advance along the path of travel of the wheel 14 and the lever arm 174 by means of cam follower 182 following the cam track 184, begins to pull the valve 154 and brush-and-nozzle assembly 16 outward, the valve-activating cam follower 202 in engagement with cam track 204 depresses the valve stem 196, causing the valve 154 to be opened. Steam and detergent, or other cleaning fluid, is therefore permitted to flow through conduit 132 to the nozzle 136 to effect cleaning action. As the carriage 10 advances along its tracks, the brush and nozzle assembly 16 is held in contact with the side of the wheel 14 by means of a resilient pressure exerted by tension of spring 178, so that regardless of variations in the wheel 14 from the exact path of travel through the assembly, the brush 138 and nozzle 136 are always in proper cleansing position. At the fully advanced position of the carriage 10, the cam follower 182 clears the tip 186 of the cam track 184, and the valve 154, and the brush-and-nozzle assembly 16 are immediately returned to the retracted position (shown in Fig. 6) by the combined action of spring 208 and the jet action of the steam or cleansing fluid passing through the nozzle 136. The valve 154 is immediately closed.

Upon return of the carriage 10 to its starting or retracted position, the cam follower 182 must pass the starting point 185 of the cam track 184, so that it is in position to start another cleaning operation. In order to permit this passage, the cam track 184 is provided at its starting end with a gate portion 210, best shown in Figs. 5 and 6, pivotally connected to the remaining part of the track 184 by means of a hinge 212. The gate portion 210 is normally retained in the proper starting position by means of a spring 214, one end of which is attached to a lug 216 on said gate portion 210 and the other end of which is attached to a lug 218 fixed to the main body of the cam track 184. In order to make certain that the cam follower 182 follows its proper path and passes through gate 210 during the return of carriage 10, a return guide track 220 is provided. This guide track 220 converges toward the gate 210 so that the cam follower 182 must pass through such gate on its return travel. The operation will be clear from Fig. 5, wherein a first position of the cam follower 182 is shown in solid lines as it approaches the gate 210 on the return of the carriage 10 to starting position. The first position is designated as "a." A second position is designated at "b" wherein the cam-follower 182 shown in dot-dash lines is passing through gate 210, such gate, also shown in dot-dash lines, in this position having been swung open by impact of the moving cam-follower 182. Upon the start of another cycle of operation, the cam follower 182, again shown in dot-dash lines, follows cam track 184 as shown at position "c," the gate 210 having closed immediately after passage of the cam follower 182.

The various elements of the carriages 10 are substantially all below the top edges of the frame, thus permitting cover plates 224 and 226 to be placed over the entire top of the carriages excepting the path of the valve 154 and the flexible hose 156.

The wheel-spinning roller assemblies generally designated at 18 and 19 comprise idler rollers 230 and powered rollers 232. The rollers 230 and 232 are mounted for rotation in bearing block assemblies 234 and 236 on either side thereof. The idler rollers 230 have smooth surfaces whereas the powered rollers 232 have a roughened or corrugated surface, as shown at 238, to permit a better grip on the tires passing in contact therewith. It will be noted that the first two and last two rollers of each roller assembly 18, 19 are idler rollers 230 mounted for free rotation, whereas the intermediate rollers comprise alternate powered rollers 232 and idler rollers 230. The rollers 230 and 232 are very closely spaced, having, for example, about ¼" clearance, and are of relatively small diameter—in the order of, for example, about 4". By reason of their close spacing and small diameter, there is substantially no bumping or jerking as the wheels 14 are towed across such rollers. In fact, there is no perceptible vertical motion of the vehicle. The strain upon the towing element and upon the vehicle remains substantially uniform. As may be observed from Fig. 2, the rollers 230 and 232 are set within a pit 240 so that their top surfaces are substantially flush with the horizontal path of travel of the vehicle wheels through the system. The bearing block assemblies 234 and 236 are mounted upon I-beams 242, which extend longitudinally within the pit 240 and are suitably mounted at their ends, as by being embedded in the concrete end walls of the pit. The lateral spacing of the roller bearing block assemblies 234 and 236 and the width of the rollers 230, 232 is such that the rollers 230, 232 extend laterally substantially from the inner guide rails 243, defining the minimum inside boundary for the path of travel of vehicle wheels through the washing system, to an outer imaginary line parallel with guide rails 243 and passing through the outer tip of brush-and-nozzle assembly 16 in its fully retracted position and defining the maximum outer boundary for the path of the vehicle wheels. It will be noted that the roller 84 carried by the arm 82 of carriage 10 covers substantially the same lateral path of travel. The device, accordingly, accommodates the different wheel spacings of different makes of cars without adjustment other than that automatically accomplished by this brush-and-nozzle assembly extending means.

A motor 244 is mounted within the pit 240 upon a bracket 245 secured to one of the I-beams 242. Motor 244 is connected by means of a flexible coupling 246 to a stub shaft 248 extending through bearing block 236 from one of the rollers 232 of roller assembly 18. The stub shaft 248 is provided with a sprocket 250 carrying a drive chain 252 which meshes with a sprocket 254 on a stub shaft 256 extending through bearing block assembly 236 from a second of the rollers 232. The stub shaft 256 carries a second sprocket 258 carrying a drive chain 260 which engages a further sprocket 262 on a stub shaft 264 extending through bearing block assembly 236 from a third roller 232. The last-mentioned stub shaft 264 is connected through a universal joint 266 to a shaft 268 connected by a further universal joint 270 to a stub shaft 272 of a roller 232 of the opposite roller assembly 19. The rollers 232 of this assembly 19 are driven in synchronism with the rollers 232 of the first assembly 18 by means of sprockets 274, 276, 278, and 280 connected by drive chains 282 and 284.

In order to start the rollers 232 into operation for a wheel-spinning action, a microswitch 286 is provided in the circuit to the motor 244. This microswitch 286 is physically located adjacent the outer rail 33 of track assembly 12, and is provided with switch lever 288 adapted to be engaged and depressed by a cam element 290 carried by the outer wall 20 of the carriage 10. The cam element 290 depresses the switch lever 288 and maintains it in depressed position during the entire passage of the carriage 10 from the position at which the forward end of cam element 290 passes switch lever 288 to the fully advanced position of the carriage 10. By properly positioning the switch 286 and switch lever 288, the motor circuit is closed and the motor 244 begins to spin the rollers 232 at a time just prior to passage of the tires 14 upon the roller assemblies. The motor circuit is broken automatically when the carriage 10 is returned and the cam element 290 clears the switch lever 288. Accordingly, the rollers 232 are automatically powered only when a vehicle is being moved across the roller assemblies 18, 19. This provides a safety feature preventing operators or observers from accidentally stepping on the rollers while they are being spun.

The device of the invention is further provided with rinsing means which are automatically actuated at the forward position of the carriages 10. Such means are best shown in Figs. 1, 2 and 4, and comprise conduits 300 and 301 connected by means of T 302 through a valve 303 and line 304 (Fig. 2) to a suitable source of rinsing fluid under pressure. The conduits 300 and 301 extend respectively adjacent the forward end of the pair of track assemblies 12. Each conduit 300, 301 has upstanding spray elements 305 and 306 (Fig. 4) provided with a plurality of spray openings 308 directed toward the wheels of the vehicle. A valve control arm 310 is pivotally mounted at the forward end of one of the track assemblies 12 by means of pin 312 upon a suitable bracket 314 secured to the floor 37 of the washing room. A rod 316 extends upwardly from one end of the control arm 310, and is adapted to be engaged at the forward portion of the carriage 10 in its fully advanced position by a striker member 317 secured below side wall 22 of the carriage 10. The angle of the striker member 317 may be adjusted by adjusting screw 318 carried by bracket 319. Upon engagement of the striker member 317 with rod 316, the arm 310 is moved in a counterclockwise direction, as viewed in Fig. 4. The other end of arm 310 is connected to one end of a control cable 320 which has its other end connected through spring 321 to the valve handle 322 of valve 303. The valve 303 is of the flush type which is normally urged to a closed position by resilient means within the valve body. Upon actuation of control arm 310, the valve 303 is opened, and water or other rinsing fluid is sprayed through spray elements 305 and 306 upon the wheels, thereby rinsing off any remaining detergent or other cleaning fluid. The valve 303 returns to its normal closed position after the carriage 10 has been retracted, thereby shutting off the rinsing fluid.

The space between the roller assemblies 18 and 19 over the pit 240 is partially closed by longitudinally extending plank 324 upon which the tow chain 326 rests in its travel throughout the washing assembly. The remaining space over the pit 240 is closed by a cover plate 328 which is supported on one side by one of the inner guide rails 243 and on its ends upon the concrete end walls of the pit 240. A pair of handles 330 are provided so that the cover plate 328 can be moved to permit access to the motor and other mechanism in the pit. It will be observed that there is no opening through which a vehicle or wheel thereof could inadvertently be dropped. The bottom of the pit 240 is connected to a drain sump 331 which carries off rinse water, detergent, and other liquids.

The operation of the apparatus may be further illustrated by reference to Figs. 11 through 14. In Fig. 11, the wheel 14 of a vehicle being towed through the washing system has just contracted roller 84 of arm 82 and is about to move the carriage 10 forward, or to the left as viewed in this figure. The pressure of the wheel 14 upon roller 84 causes the carriage 10 to advance to a position shown in Fig. 12, whereby the action of the cam follower 182 upon the cam track 184 has forced the brush-and-nozzle assembly 16 outward into a position where the brush 138 is in full contact with the tire of the wheel 14, and is being urged against such tire by means of spring tension. The cleaning fluid, such as steam and detergent, was automatically turned on at the beginning of the camming action. At the position shown in Fig. 12, the carriage 10 has moved forward a sufficient distance so that the switch lever 288 actuating switch 286 in the motor circuit is about to be depressed by the cam element 290 of the carriage 10. The wheel 14 in this position has just approached the first of the rollers 230. Alternate rollers 232 now begin to rotate rapidly and spin the wheel 14 throughout the course of its travel across the roller assembly, the tire of such wheel all during this time being subjected to the scrubbing action of brush 138 and the influence of the jet of the steam and detergent issuing through the nozzle 136. In the position shown in Fig. 13, the carriage 10 has reached the end of its forward travel whereby locking element 106 is about to be engaged by stop element 116 whereby the arm 82 may be released for passage of the wheel 14 as shown in Fig. 14. In the position shown in the latter figure, the cam follower 182 has cleared the tip 186 of the cam track 184 and is retracted for passage to the rear through the reset mechanism including the gate 210. At the same time the flow of cleaning fluid to nozzle 136 has been automatically cut off. The striker member 317 below carriage 10 has tripped rinse valve control arm 310, thereby turning on the valve 303 (Fig. 2) whereby the wheel 14 is being subjected to rinsing sprays through the spray elements 305 and 306. The carriage 10 is then immediately and rapidly retracted so that it is in position for washing the next wheel—either of the same vehicle or a following vehicle, which may be towed in bumper-to-bumper relation with the vehicle just washed.

It will be observed that the entire operation is entirely automatic, requires no attention from the operator other than a routine check from time to time, without adjustment will wash wheels of cars of different makes having different wheel spacings and different wheel bases, and, moreover, will effectively wash both black and white side wall tires, making the black tires clean and glossy and the white tires sparkling white.

While the device described provides only for the washing of the side walls of the tire portions of the wheels, it will be understood that the hub portions can also be washed by the provision of larger or additional brushes and nozzles. The term "wheel" or "wheels" is used herein in a broad sense to include the tire portions and/or other portions of the wheel structure.

It will be understood that the exact embodiment of the invention herein described in detail is by way of illustration only, and that various changes in design may be made without departing from the principles of the invention.

We claim:

1. Wheel-washing apparatus comprising, in combination, a track assembly adapted to be positioned parallel to the path of travel of a vehicle wheel, a carriage mounted on said track assembly, retractable means carried by said carriage for engaging said vehicle wheel for a portion of its path of travel to thereby move said carriage along said track assembly, wheel-cleansing means movably mounted on said carriage and adapted to be laterally extended outward therefrom toward said wheel, and cam means forming a portion of said track assembly and carriage and cooperating during a portion of the forward travel of said carriage along said track to urge said wheel-cleansing means outward from said carriage into wheel-cleansing position, said cam means including a cam track forming part of said track assembly and a cam follower carried by said carriage and resiliently linked to said wheel-cleansing means.

2. Wheel-washing apparatus as defined in claim 1, wherein said wheel-cleansing means comprises an arm slidably mounted on said carriage for reciprocating movement outward therefrom, a brush-and-nozzle assembly at the outer end of said arm, and means connecting said brush-and-nozzle assembly to a source of cleaning fluid.

3. Wheel-washing apparatus as defined in claim 2, in which said arm comprises a conduit for supplying cleaning fluid to said brush-and-nozzle assembly, a valve is included in said conduit, and cam means are provided for actuating said valve upon outward movement of said conduit.

4. A wheel-washing apparatus as defined in claim 2 wherein said brush-and-nozzle assembly comprises a nozzle having an outer face substantially conforming in curvature to at least a portion of the side face of a vehicle wheel, and a brush having an outer face of similar configuration mounted for pivotal motion about a point at the lower end of said nozzle and resiliently urged outwardly from said nozzle at the top thereof, whereby said brush is automatically adjustable to engage substantially the entire portion of said wheel adjacent the outer faces of said brush and said nozzle.

5. Wheel-washing apparatus as defined in claim 1, including resilient means urging said wheel-cleansing means to retractable position, said cam means at a forward position of said carriage at the end of a wheel-cleansing operation permitting return of said wheel-cleansing means to said retracted position.

6. Wheel-washing apparatus as defined in claim 1, including means on said carriage for locking said retractable means in outward extended position in the path of said wheels, and means at the forward position of said carriage on said track assembly to unlock said retractable means so that said retractable means may be retracted to permit passage of said wheel.

7. Wheel-washing apparatus comprising, in combination, a track assembly adapted to be positioned parallel to the path of travel of a vehicle wheel, a carriage mounted on said track assembly and adapted to be moved from a starting position at the rear of said track assembly to a forward position at the other end of said track assembly, retractable means carried by said carriage for engaging said vehicle wheel for a portion of its path of travel to thereby move said carriage along said track assembly from said starting position to said forward position, wheel-cleansing means movably mounted on said carriage and adapted to be extended outward therefrom toward said wheel, and cam means for urging said wheel-cleansing means outward from said carriage into wheel-cleansing position, said cam means comprising a cam track forming part of said track assembly and a cam follower carried by said carirage and resiliently linked to said wheel-cleansing means, said cam track beginning just forward of said cam follower when said carriage is in its starting position and ending at a point to the rear of said cam follower when said carriage is in its forward postion, and resilient means urging said wheel-cleansing means and said cam follower to a retracted position.

8. The combination of claim 6, wherein said cam track is provided with gate means to permit return of said cam follower for another wheel-cleansing operation.

9. The combination of claim 6, wherein said wheel-cleansing means comprises a movable unit including a rigid conduit slidably mounted on said carriage, a brush-and-nozzle assembly at the outer end of said conduit, and a normally closed valve at the other end of said conduit, said valve being adapted to connect said conduit to a source of cleaning fluid, said valve and carriage including means for automatically opening said valve upon outward movement of said movable unit into wheel-cleansing position.

10. The combination of claim 6, including wheel-spinning means comprising a roller assembly including a plurality of idler rollers and powered rollers in alternate relationship positioned in the path of travel of said wheel adjacent said track assembly to thereby spin said wheels while engaged by said wheel-cleansing means, and means responsive to the forward movement of said carriage along said track assembly for automatically actuating said wheel-spinning means.

11. The combination as defined in claim 9, wherein said rollers are of relatively small diameter and are closely spaced together, and wherein a pair of idler rollers is provided at each end of said roller assembly.

12. Wheel-cleansing apparatus comprising, in combination, a pair of track assemblies positioned parallel to the paths of travel of the laterally-spaced wheels of a vehicle, a carriage mounted on each of said track assemblies and adapted to be moved between a rear and forward position, means urging said carriages toward said rear position, said carriages having retractable means normally extending therefrom into the path of the wheels of said vehicle to thereby cause said carriages to be moved by said wheels along said track assemblies to said forward position, means for stopping the forward motion of said carriages at said forward position, means actuated by said stopping means for permitting retraction of said retractable means whereby said wheels may pass said carriages and said carriages are automatically returned to said rear position, a brush-and-nozzle assembly mounted on each carriage for lateral movement outward from said carriage toward the side faces of said wheels, cam means on said track assemblies and cam followers on said carriages adapted to urge said brush-and-nozzle assemblies outwardly toward said side faces of said wheels, conduit means connected to said brush-and-nozzle assemblies, valve means in said conduit means, cam means carried by said carriages for opening said valve means upon outward movement of said brush-and-nozzle assemblies, means for returning said brush-and-nozzle assemblies to a retracted position with respect to said carriages, a pair of roller assemblies respectively positioned in the path of said laterally spaced vehicle wheels between said rear and forward positions of said carriages, said roller assemblies each comprising a plurality of closely spaced rollers of relatively small diameter, means for rapidly spinning at least one of said rollers of each assembly, and means responsive to the forward travel on one of said carriages for automatically actuating said spinning means as said wheels approach said roller assemblies.

References Cited in the file of this patent
UNITED STATES PATENTS

| 1,924,005 | Stevens | Aug. 22, 1933 |
| 2,490,921 | Rousseau | Dec. 13, 1949 |
| 2,608,161 | Wallmannsberger | Aug. 26, 1952 |
| 2,692,214 | Hurst | Oct. 19, 1954 |
| 2,716,772 | Cockrell | Sept. 6, 1955 |
| 2,718,650 | Haverberg | Sept. 27, 1955 |
| 2,761,170 | Bonneau | Sept. 4, 1956 |